United States Patent [19]

Ziaylek, Jr.

[11] 4,360,859

[45] Nov. 23, 1982

[54] BOAT LIGHT HAVING RESILIENTLY FLEXIBLE AND ADJUSTABLE MOUNT

[76] Inventor: Theodore Ziaylek, Jr., 140 Riverview Dr., Yardley, Pa. 19067

[21] Appl. No.: 204,449

[22] Filed: Nov. 6, 1980

Related U.S. Application Data

[63] Continuation-in-part of Ser. No. 872,522, Jan. 26, 1978, Pat. No. 4,245,281.

[51] Int. Cl.³ .......................... B60Q 1/04; B60Q 1/06; B60Q 1/24

[52] U.S. Cl. ...................................... 362/80; 362/267; 362/285; 362/306; 362/369; 362/390; 362/430

[58] Field of Search ................. 362/80, 257, 306, 267, 362/285, 369, 390, 430

[56] References Cited

U.S. PATENT DOCUMENTS

| | | | |
|---|---|---|---|
| 1,540,476 | 6/1925 | Hoffman et al. | 362/359 |
| 2,123,483 | 7/1938 | Langille | 362/309 |
| 2,334,899 | 11/1943 | Boston et al. | 362/306 |
| 2,504,866 | 4/1950 | Morse | 362/61 |
| 2,619,582 | 11/1952 | Morse | 362/267 |
| 2,762,908 | 9/1956 | Gaither | 362/306 |
| 2,966,579 | 12/1960 | Malec | 362/369 |
| 3,043,949 | 7/1962 | Smith | 362/61 |
| 3,354,303 | 11/1967 | Manke | 362/61 |
| 3,529,149 | 9/1970 | Dwyer | 362/306 |
| 3,833,955 | 9/1974 | Hulbert | 362/61 |
| 4,198,627 | 4/1980 | Urbanek | 362/369 |

*Primary Examiner*—Irwin Gluck
*Attorney, Agent, or Firm*—Frederick A. Zoda; John J. Kane; Albert Sperry

[57] ABSTRACT

A boat light includes a shield recessed within the hull of a vessel. A conventional sealed beam head-lamp unit seats in an exteriorly spherically shaped lamp unit retaining member formed of a resiliently flexible soft material such as rubber. The retaining member and shield have mating spherically shaped surfaces so that the retaining member can be angularly adjusted, within a pre-determined, limited range, to any of various selected positions within the shield, thus to correspondingly adjust and hence correctly aim, the head-lamp unit. The retaining member is quickly and firmly secured, in each position to which it is adjusted, through the provision of a soft rubber mounting ring, which fits over the inner end of the shield, and is spherically shaped interiorly thereof, to form a ball-and-socket mounting cooperating with the shield and the retaining member. Upon tightening of a metal clamping ring that extends around the mounting ring, the mounting ring is resiliently contracted in a radially inward direction, to tightly grip the retaining member and in this way secure the retaining member firmly in the selected position of adjustment.

11 Claims, 2 Drawing Figures

FIG. 1
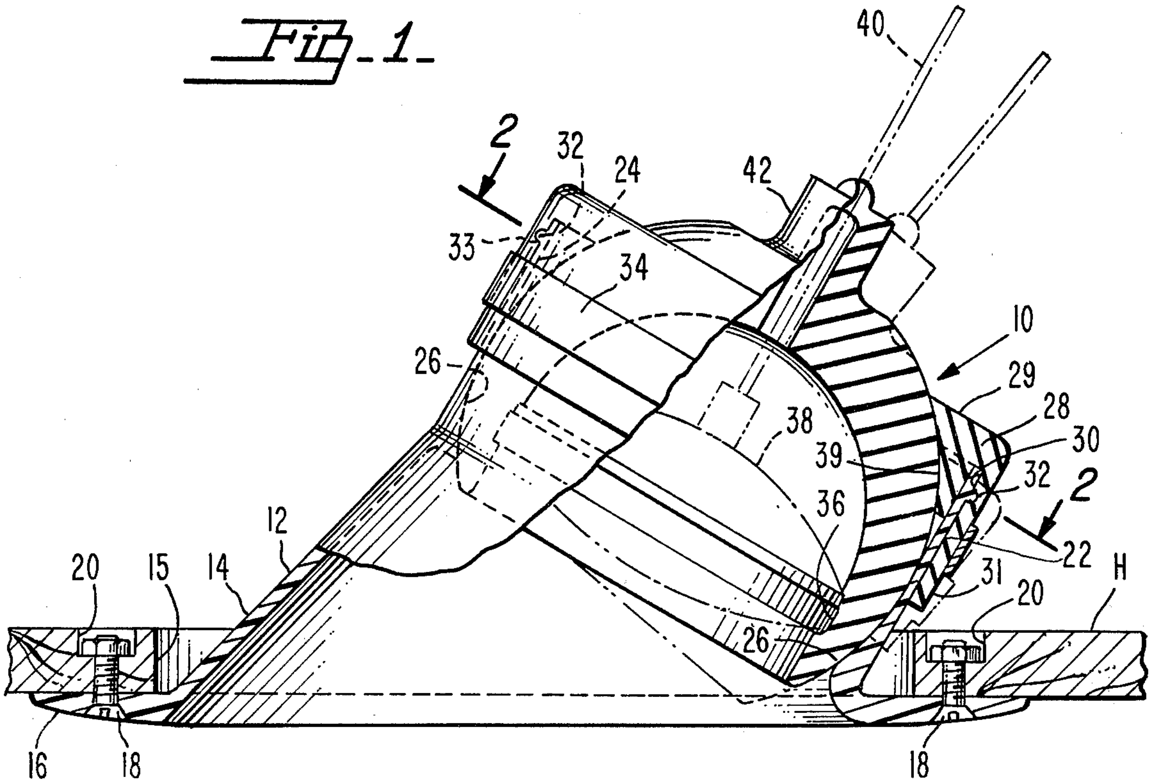
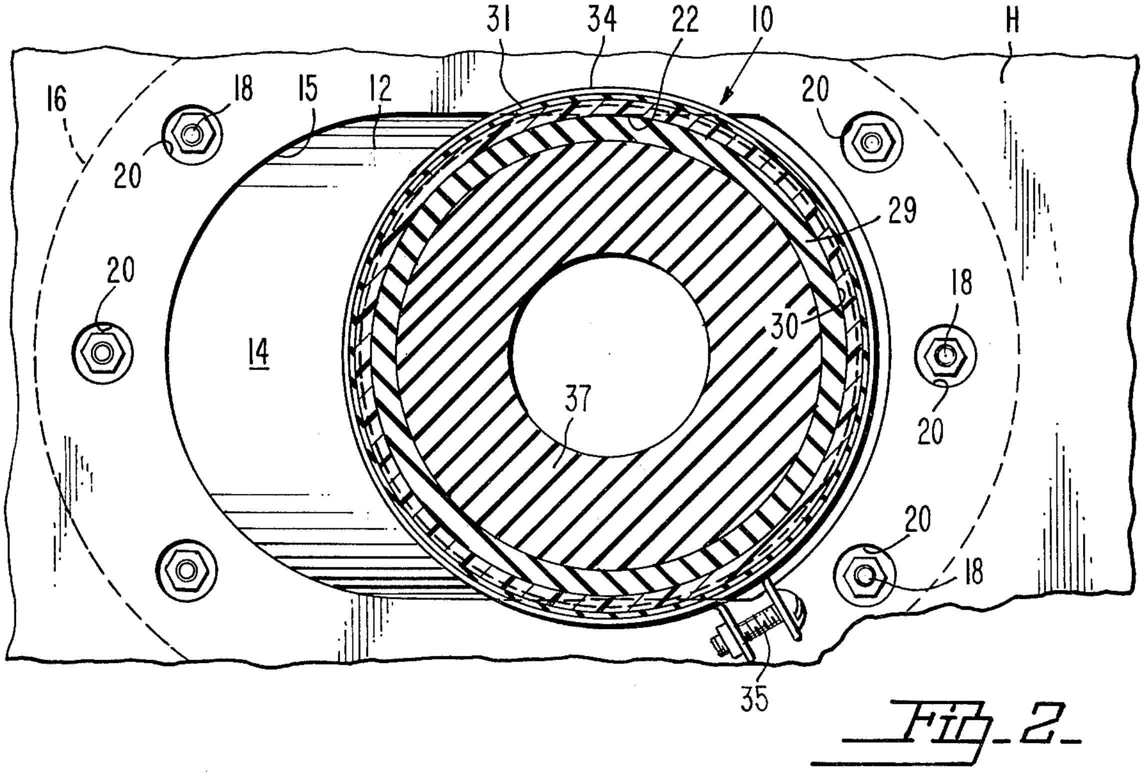
FIG. 2

BOAT LIGHT HAVING RESILIENTLY FLEXIBLE AND ADJUSTABLE MOUNT

CROSS-REFERENCE TO RELATED APPLICATIONS

The present application is a continuation-in-part of application Ser. No. 872,522 filed Jan. 26, 1978, entitled "Adjustable Hull Light Assembly", now U.S. Pat. No. 4,245,281.

BACKGROUND OF THE INVENTION

1. Field of the Invention

The present invention relates to the field of boat lights of the type recessed within the hulls of cabin cruisers and other water craft. In a more particular sense the invention relates to the field of illumination, and especially to lamp mountings coming within this category, adapted to provide supports for head-lamp units and further adapted for adjustable re-positioning as desired. The support means for the head-lamp unit incorporates cooperating members of flexible material and hence may be appropriately classified among those patents relating to illuminating devices or their supports, with flexible, adjustably positionable modifiers.

2. Description of the Prior Art

Heretofore, lamp units for mounting in recessed arrangements in the hulls of vessels, have been so mounted in a way that will permit their adjustment for the purpose of directing the light beams along selected paths. However, considerable difficulty has been experienced in providing units of this type which will include satisfactory means for adjustably re-positioning the lamp units, while at the same time offering suitable heat resistance, resistance to the corrosive effects of fresh or salt water, adaptability for easy replacement of head-lamp units, and very importantly, a facility for adjustment within a wide range in directions having both horizontal and vertical components, along with a capability of effecting said adjustments with speed and ease, and with maximum retention of any adjustment that is made. So far as is known, generally improved devices that possess all of these desirable characteristics have not been conceived, or if they have been developed, have not proven completely satisfactory from the standpoint of durability and the ability to withstand heavy vibration, and other rough usage or adverse conditions encountered during the normal operation of the boats in which they are mounted.

SUMMARY OF THE INVENTION

Summarized briefly, the invention comprises a conventional sealed beam head-lamp unit, removably but firmly gripped in an internal seat of a cup-like lamp retaining member formed wholly of soft rubber. The retaining member has a spherically shaped exterior surface, seating snugly in a complementary internal surface of a plastic shield adapted to be mounted in a suitable opening of the boat hull and normally disposed obliquely to the general plane of the hull at the location where it is mounted. The exterior, spherically shaped surface of the retaining member also engages the complementarily shaped inner surface of a rubber mounting ring, that fits over both the retaining member and the inner end of the shield. The mounting ring, made of soft rubber, has a sidewall about which is extended a radially contractible clamping ring.

The clamping ring, when loosened, relieves the face-to-face contact between the soft rubber, spherical faces of the mounting ring and retaining member, permitting the retaining member to be adjusted, within a pre-determined limit, for the purpose of directing the light beams of the supported lamp unit along a particular path. This path may have both vertical and horizontal components, due to the fact that the shield, ring, and retaining member cooperate to provide a mount of the ball-and-socket type for the lamp unit. When the adjustment has been completed, the clamping ring is tightened. As a result, this causes the soft rubber mounting ring to be radially contracted into gripping engagement with the soft retaining member, developing a face-to-face engagement between the retaining member and the mounting ring characterized by a frictional contact of high value, effective to cause the retaining member to be tightly gripped and hence securely held in the selected position of adjustment.

The obliquely disposed shield supporting the retaining member and the mounting ring is of a molded plastic material, but is effectively shielded from the heat of the lamp unit, by the rubber material of the retaining member and the mounting ring, which have a high heat-insulative value. Further, there is a high resistance to the corrosive effects of salt water, in the lamp support assembly comprised in the present invention, resulting from the fact that there is no metal-to-metal contact, accompanied by the fact that metallic materials are held to an absolute minimum. Metallic materials, of course, are especially subject to corrosion, and in particular it is important to avoid metal-to-metal contact in assemblies of this type, by reason of the fact that corrosion occurs at the interface of the metal parts causing them to be permanently bonded together. As a result, it is often necessary to discard the entire boat light assembly due to the inability to separate corroded parts thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a view of a boat light assembly according to the present invention, the boat hull in which the assembly is mounted being shown fragmentarily and in section, the assembly being illustrated partly in elevation and partly in longitudinal section, a head lamp unit being illustrated in dotted outline, and the adjustable parts of the assembly being illustrated in different positions to which they may be adjusted, in full and chain-dotted lines respectively; and FIG. 2 is a sectional view substantially on line 2—2 of FIG. 1, the boat hull being illustrated fragmentarily.

DESCRIPTION OF THE PREFERRED EMBODIMENT

The reference character H denotes a fragmentary portion of a boat hull. Designated generally at 10 is the boat light assembly comprising the present invention. Normally, one of these assemblies would be provided at each side of the bow, in the forward portion of the hull.

It is known to provide boat light assemblies of the general type illustrated, that is, such assemblies normally incorporate head-lamp units supported by the inner end portions of obliquely extending shields mounted in recessed positions within openings provided in the boat hulls for this specific purpose. The head-lamp units, when so mounted, are designed for adjustment, so that the light beams emanating therefrom may be directed along selected paths having both vertical and horizontal components. A typical assembly of this type may be noted in Malec U.S. Pat. No. 2,966,579 issued Dec. 27, 1960, as well as in my U.S. Pat. No. 4,245,281 referred to above.

In the present invention, accordingly, there is provided a molded plastic shield 12 cylindrical in form, including an elongated tubular body 14 adapted to be recessed within the boat hull, and disposed obliquely to the general plane of the boat hull. This is for the purpose of having the shields of boat light assemblies disposed at opposite sides of the bow of the boat, so arranged as to be directed along paths parallel to each other and to the general length of the boat. In any event, shield 12 in the illustrated example of the invention includes the cylindrical tubular body 14 which, at its forward or outer end, extends through an oblong opening 15 formed in the boat hull. At its outer end, the body 14 is integrally formed with an outwardly directed, continuous, peripheral mounting flange 16, having openings formed at suitably spaced intervals therein, registering the counter-sunk openings 20 formed in the boat hull. Mounting bolts 18 are extended through the registered openings of the flange 16 and boat hull, so as to fixedly and securely mount the shield 12, and hence the entire boat light assembly 10, in a recessed position within the oblong opening 15 of the hull.

Integral with the tubular body portion 14 of the shield 12, and also comprising a part of the shield, is an inner end portion 22, which exteriorly is of cylindrical, constant diameter form. The inner end portion 22 of the shield has an inner surface 24 at its distal end, said surface 24 being of a constant internal diameter and merging into a spherically shaped wall surface portion 26 where the sleeve or inner end portion 22 merges into the body portion 14 of the shield.

The inner end portion or mounting sleeve of the shield is relatively thin-walled, so as to have a limited amount of flexibility, that is to say, this part of the shield can be contracted radially inwardly upon the application of a suitable force tending to cause its deflection in this manner.

A mounting ring 28 is formed of a soft rubber material, and may be noted as comprising a flat, thick end wall 29 having a large center opening and also having, in concentric relation to the center opening, a deep, narrow, forwardly opening groove 30 adapted to receive the inner end portion 22 of the shield. In the outer wall of the groove 30 there is formed, near the inner end of the groove, a continuous bead-receiving groove 32, adapted to receive a mating outwardly facing, continuous peripheral bead 33 formed upon the outer surface of the portion 22 of the shield.

The mounting ring 28 is also formed with a sidewall 31, which projects forwardly in face-to-face contact with the portion 22. Thus, the mounting ring 28 defines a centrally apertured, flexible, cup-shaped cap for the inner end of the shield, securely engaged with and enveloping the entire inner end portion 22 thereof.

Designated at 34 is a metal clamping ring which in and of itself is of conventional design, being of the type adapted to be contracted radially inwardly through the provision of a screw 35 engaged with the ends of the clamping ring. Upon rotation of the screw in one direction, the ring is contracted radially, exerting pressure against the soft material of the sidewall 31, through which the pressure is transmitted to the inner end portion 22 of the shield tending to radially contract the shield at this point. At the same time, the contraction of the clamping ring causes the entire soft mounting ring 28 to be forced radially inwardly, into a tight, gripping engagement with a retaining member 37 having an internal seat 36 in which is removably engaged the peripheral portion of a conventional sealed beam head-lamp unit 38. The retaining member 37 is formed of a soft rubber material and has a spherically shaped outer surface, part of which complements and is firmly engaged against the spherically shaped seat 26 of the shield. Another part of the spherical outer surface of the retaining member is engaged against the complementarily shaped wall 39 of the center opening of the mounting ring 28.

Integrally formed upon the retaining member is a projection 42, having a center opening through which extends the cord 40 through which electrical current is supplied to the head-lamp unit.

By reason of this arrangement, upon relaxation of the clamping ring 34, the grip of the mounting ring 28 upon the retaining member 37 is correspondingly relaxed. As a result, the retaining member can be bodily adjusted, within a prescribed range of movements, to aim the head-lamp unit in a selected direction. The adjustment, as will be readily appreciated, can have both vertical and horizontal components, due to the fact that the mounting of the retaining member is a ball-and-socket type of mounting, allowing the desired movement of the retaining member.

When the retaining member has been adjusted to a selected position, as for example the chain-dotted position shown in FIG. 1, all that is necessary is to tighten the clamping screw 35, so as to contract the clamping ring. As a result, radial inward pressure is exerted against the inner end portion 22, and also against the mounting ring 28, causing the retaining member 37 to be tightly gripped, both at the location of the seat 36 and at the location of the wall 39. This adjustment is preserved despite the fact that during normal operation of the boat, there is a tendency for adjustments of this type to loosen due to vibrations transmitted thereto during normal operation of the engines of the vessel, and also due to stresses and strains incurred by the boat light assembly during operation of the vessel in heavy weather.

The device thus has an important and highly desirable capability of retaining any of a wide variety of adjustments, even under the most adverse of conditions. Still further, the construction has the important and highly desirable characteristic of high resistance to corrosion, since the assembly is composed mainly of soft rubber parts, which can be fashioned from a material particularly selected for its resistance to the highly corrosive forces encountered during normal operation of a boat, whether in salt or fresh water. Metal-to-metal contact is avoided, and parts that are subject to deformation or outright destruction under high heat conditions need not be used, in practicing the invention.

My boat light assembly has been disclosed, by way of example, as one so designed that a pair of the assemblies may be mounted near the bow of the boat and aimed forwardly. It will be understood, however, that this is merely one example of how the invention can be used. The assembly could, for example, be designed so that flange 16 lies in a plane normal (or approximately so) to the length of the shield 12, rather than being disposed obliquely thereto. This arrangement would be usable, for example, where the assembly is to be mounted in the transom of the boat, to direct its beam rearwardly from the stern of the vessel.

While particular embodiments of this invention have been shown in the drawings and described above, it will be apparent that many changes may be made in the form arrangement and positioning of the various elements of the combination. In consideration thereof it should be understood that preferred embodiments of this invention disclosed herein are intended to be illustrative only and not intended to limit the scope of the invention.

I claim:

1. A boat light assembly comprising:

(a) a shield adapted for mounting upon a boat hull;

(b) a cup-shaped lamp unit retaining member formed of a soft flexible material extending within the shield;

(c) a lamp unit carried by said member;

(d) a mounting ring carired by the shield and receiving said member, said ring being formed of a soft flexible material and extending about the retaining member in engagement therewith, said retaining member, shield, and ring providing a ball-and-socket mounting in which the retaining member forms the ball and the shield and ring form a mating socket in which said member is mounted for limited adjustment in any of various selected directions each having a horizontal and/or a vertical component; and (e) means for radially contracting the mounting ring into gripping engagement with the retaining member in selected positions to which the retaining member is adjusted, to an extent effective for flexure of the retaining member and ring into frictional locking engagement with each other.

2. A boat light assembly as in claim 1 wherein the retaining member has a spherically shaped outer surface, the shield having an inner surface of mating spherical contour to mount the retaining member therein for said adjustment.

3. A boat light assembly as in claim 2 wherein the spherical outer surface of the retaining member is continued within the area thereof engaged by the mounting ring, the mounting ring having a center opening the edge of which is spherically shaped complementarily to the spherical contour of the retaining member, whereby said shield and ring form separate parts of a socket both of which are in contact with the spherically shaped surface of the retaining member.

4. A boat light assembly as in claim 3 wherein the mounting ring is also of cup-shape, including an end wall in which said opening thereof is formed, the mounting ring further including a sidewall extending about the shield.

5. A boat light assembly as in claim 4 wherein the mounting ring has an internal, circular groove, the shield having an inner end portion engaged in said groove.

6. A boat light assembly as in claim 5 wherein the mounting ring and shield have a bead and groove engagement with each other, whereby to prevent separation of the mounting ring from the shield.

7. A boat light assembly as in claim 1 wherein said means for contracting the mounting ring radially inwardly against the retaining member comprises an annular clamping element extending about the mounting ring and adapted to be progressively reduced in diameter to exert a radial inward pressure against the mounting ring tending to bind the same against the retaining member.

8. A boat light assembly as in claim 1 wherein said shield is formed as an open ended sleeve, one end of said sleeve having a mounting flange disposed in a plane angular to the long axis of the sleeve and adapted to be secured to the boat hull about the edge of an opening formed in said hull to accommodate the shield.

9. A boat light assembly as in claim 8, wherein the shield, at its other end, is formed with a cylindrically shaped end portion, the mounting ring being disposed to constitute a cap for said end portion.

10. A boat light assembly as in claim 9 wherein the mounting ring is of cup-shape, including a sidewall extending about the inner end portion of the shield, said mounting ring having an internal groove receiving said inner end portion.

11. A boat light assembly as in claim 10 wherein the inner end portion of the shield is thin-walled and has limited flexibility to an extent such that it is adapted to be forced radially inwardly together with the mounting ring, into frictional locking engagement with the retaining member responsive to the contraction of said means about the mounting ring.

* * * * *